United States Patent
Hepper et al.

(10) Patent No.: US 8,239,493 B2
(45) Date of Patent: Aug. 7, 2012

(54) AUTOMATED SERVER CONTROLLED CLIENT-SIDE LOGGING

(75) Inventors: Stefan Hepper, Holzgerlingen (DE); Marshall Allen Lamb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 12/427,273

(22) Filed: Apr. 21, 2009

(65) Prior Publication Data

US 2010/0268759 A1 Oct. 21, 2010

(51) Int. Cl.
*G06F 15/16* (2006.01)
(52) U.S. Cl. .................................... 709/219
(58) Field of Classification Search ............ 709/219
See application file for complete search history.

(56) References Cited

U.S. PATENT DOCUMENTS

| | | | |
|---|---|---|---|
| 6,061,518 A | 5/2000 | Hoffman | |
| 6,438,592 B1 * | 8/2002 | Killian | 709/224 |
| 6,728,769 B1 | 4/2004 | Hoffmann | |
| 7,293,281 B1 | 11/2007 | Moran et al. | |
| 7,340,722 B2 | 3/2008 | Dencker et al. | |
| 7,523,191 B1 * | 4/2009 | Thomas et al. | 709/224 |
| 2002/0188696 A1 * | 12/2002 | Ullmann et al. | 709/219 |
| 2004/0054715 A1 * | 3/2004 | Cesario | 709/203 |
| 2004/0123279 A1 | 6/2004 | Boykin et al. | |
| 2005/0028171 A1 | 2/2005 | Kougiouris et al. | |
| 2005/0223283 A1 | 10/2005 | Frey et al. | |
| 2006/0015842 A1 | 1/2006 | DeSantis | |
| 2006/0174165 A1 | 8/2006 | Shaffer et al. | |
| 2006/0184913 A1 | 8/2006 | Coulthard et al. | |
| 2007/0255818 A1 * | 11/2007 | Tanzer et al. | 709/224 |
| 2008/0010339 A1 | 1/2008 | Shin et al. | |
| 2008/0052664 A1 | 2/2008 | Batabyal | |
| 2008/0082965 A1 | 4/2008 | Atkin et al. | |
| 2009/0037892 A1 * | 2/2009 | Luedde | 717/153 |
| 2009/0271514 A1 * | 10/2009 | Thomas et al. | 709/224 |

OTHER PUBLICATIONS djce.org.uk, "What's in an HTTP request?", Jul. 13, 2008, pp. 1-3.*
Author Unknown, JavaScript Client-Side Dynamic Documents, eBook, 2001, pp. 1-33, Netprog: JavaScript, Published for download on the World Wide Web.
Richard Atterer, Logging Usage of AJAX Applications With the "UsaProxy" HTTP Proxy, Article, 2006, pp. 1-4, Media Informatics Group, Munich, Germany.

* cited by examiner

*Primary Examiner* — Ryan Jakovac
(74) *Attorney, Agent, or Firm* — Lee Law, PLLC; Christopher B. Lee

(57) ABSTRACT

A request for web content is received from a web client device at a web content server. At least one of a logging enablement status and a logging level associated with the web content is determined. Client-side logging executable syntax is configured within the web content based upon the determined logging enablement status and logging level associated with the web content. The web content with the configured client-side logging executable syntax is sent to the web client device. This abstract is not to be considered limiting, since other embodiments may deviate from the features described in this abstract.

22 Claims, 6 Drawing Sheets

AUTOMATED SERVER CONTROLLED CLIENT-SIDE LOGGING

BACKGROUND OF THE INVENTION

1. Field of the Invention

The present invention relates to systems and methods for logging web content execution diagnosis events on web client devices. More particularly, the present invention relates to automated server controlled client-side logging.

2. Related Art

Web application developers create executable content for web sites by use of programming syntax, such as Javascript, that executes on web client devices when a web page is rendered on the web client devices. Javascript may be used for browser-based client-side programming for Web 2.0-style applications. Browser applications executed by the web client devices include functionality to interpret or compile Javascript at runtime to allow executable web content coded in Javascript to be rendered on the web client devices. Services from disparate sources may be combined to build applications, such as applications known as "mashups," that may be rendered and executed on the web client devices.

BRIEF SUMMARY OF THE INVENTION

The subject matter described herein provides automated server controlled client-side logging. The automated server controlled client-side logging provides debugging and diagnostic capabilities for executable syntax, such as Javascript, downloaded from a web server device and executed within web client devices. Upon receipt of a request for web content from a web client device, a web content server determines logging configuration information, such as a logging enablement status and a logging level, associated with the web content. The logging configuration information may be statically provisioned or dynamically configured at the web content server. Client-side logging is configured within the web content by insertion of client-side logging executable syntax, such as Javascript variables and executable code, that causes the web client device to log information associated with the client-side logging configuration when the web client device executes the client-side logging executable syntax. The web client device identifies and returns matching log information to the server for analysis and processing. The log information may alternatively be viewed by an authorized user on a display of a web client device.

A method includes receiving, at a web content server, a request for web content from a web client device; determining at least one of a logging enablement status and a logging level associated with the web content; configuring client-side logging executable syntax within the web content based upon the determined at least one of the logging enablement status and the logging level associated with the web content; and sending the web content with the configured client-side logging executable syntax to the web client device.

A system includes a memory adapted to store logging configuration information; and a processor programmed to: receive, at a web content server, a request for web content from a web client device; determine at least one of a logging enablement status and a logging level associated with the web content based upon the logging information stored within the memory; configure client-side logging executable syntax within the web content based upon the determined at least one of the logging enablement status and the logging level associated with the web content; and send the web content with the configured client-side logging executable syntax to the web client device.

An alternative system includes a memory adapted to store logging configuration information; and a processor programmed to: receive, at a web content server, a request for web content from a web client device; determine at least one of a logging enablement status and a logging level associated with the web content based upon the logging information stored within the memory; assemble markup language (ML) elements of the web content; identify a Java tag reference within the web content, where the Java tag reference identifies a component within a Java taglib configured based upon the at least one of the logging enablement status and the logging level associated with the web content; import the Java taglib into a JavaServer Pages (JSP) component; execute the Java taglib; generate, via the Java taglib component, client-side logging executable syntax comprising at least one Javascript variable associated with the at least one of the logging enablement status and the logging level associated with the web content; insert the client-side logging executable syntax into the web content; send the web content with the configured client-side logging executable syntax to the web client device; receive client-side logging information from the web client device in response to execution of the configured client-side logging executable syntax by the web client device; and store the received client-side logging information to the memory.

A computer program product includes a computer useable storage medium including a computer readable program. The computer readable program when executed on a computer causes the computer to receive, at a web content server, a request for web content from a web client device; determine at least one of a logging enablement status and a logging level associated with the web content; configure client-side logging executable syntax within the web content based upon the determined at least one of the logging enablement status and the logging level associated with the web content; and send the web content with the configured client-side logging executable syntax to the web client device.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

Figure 1:
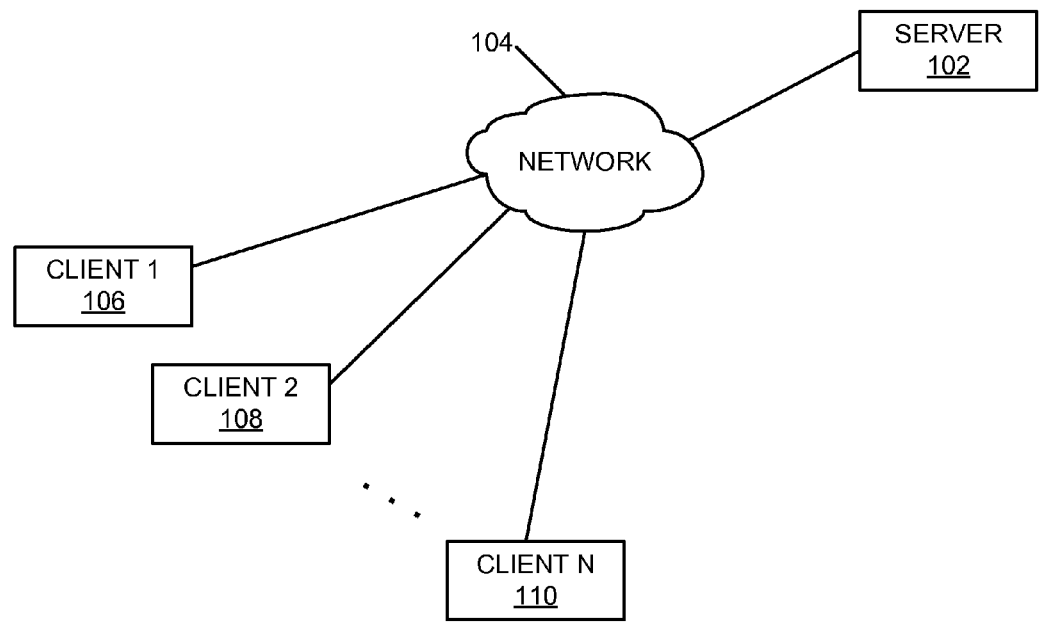
FIG. 1 is a block diagram of an example of an implementation of a system for automated server controlled client-side logging according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated server controlled client-side logging. The automated server controlled client-side logging provides debugging and diagnostic capabilities for executable syntax, such as Javascript, downloaded from a web server device and executed within web client devices. Upon receipt of a request for web content from a web client device, a web content server determines logging configuration information, such as a logging enablement status and a logging level, associated with the web content. The logging configuration information may be statically provisioned or dynamically configured at the web content server. Client-side logging is configured within the web content by insertion of client-side logging executable syntax, such as Javascript variables and executable code, that causes the web client device to log information associated with the client-side logging configuration when the web client device executes the client-side logging executable syntax. The web client device identifies and returns matching log information to the server for analysis and processing. The log information may alternatively be viewed by an authorized user on a display of a web client device.

For purposes of the present subject matter, the logging configuration information may be created, for example, by a developer of the web content. The developer may specify a package, such as a Java package and an enablement level (e.g., information, warning, error, etc.) for tracing and logging of runtime events associated with the web content rendered on web client devices. The Java package may specify a tag library package in a logging configuration for a web content server. The developer may create the tag library package to enable logging within the tag library code and to enable logging at a level specified by a configuration for the server or the web content. The configuration may be specified by the developer or a server administrator.

The tag library package may include a Java class that implements a taglib definition. The developer then compiles the taglib with a Java compiler and deploys the taglib by, for example, adding the taglib to one or more JavaServer Pages (JSPs). As such, the tag encapsulates behavior of the defined taglib class.

At runtime, in response to receipt of a request for web content, a JSP compiler identifies the tag within markup language (ML) syntax, such as hypertext markup language (HTML), as the ML syntax is assembled. Additional example markup languages include extensible markup language (XML) and standard generalized markup language (SGML). Many other markup languages exist and all are considered within the scope of the present subject matter. The JSP compiler executes the tag. Execution of the tag places executable syntax, such as Javascript, into the web content to create client-side logging executable syntax and logging enablement, and the web content server sends the web content to the web client device.

As the web content is rendered at the web client device, a browser application associated with the web client device executes the client-side logging executable syntax. The client-side logging executable syntax causes the browser application to perform logging and tracing of execution activities of the web content at the web client device at the direction of the web content server based upon logging and tracing level specified in the executable syntax. The logging and tracing may be sent to the server and/or viewed via the web client device by authorized users of the web client device. Logging may be stored on the web content server with other logging-related information and processed to debug and diagnose execution of the web content on the web client device.

The automated server controlled client-side logging described herein may be performed in real time to allow prompt feedback of client-side execution information for content distributed by a web content server. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated server controlled client-side logging. Within the system 100, a web content server 102 is interconnected via a network 104 to a web client_1 106, a web client_2 108, up to a web client_N 110.

As will be described in more detail below in association with FIGS. 2 through 6, the web content server 102 provides automated server controlled client-side logging based upon a static or dynamic configuration of the web content server 102. The web content server 102 inserts client-side logging executable syntax within web content returned to devices, such as the web client_1 106 through the web client_N 110, in response to requests for web content. The automated server controlled client-side logging may further be based upon an Internet Protocol (IP) address associated with a given web client device, such as the web client_1 106, and may be based upon a user identifier (ID) and/or username associated with a user of the web client_1 106.

The web content server 102 provides web content that may be accessed by each of the web client_1 106 through the web client_N 110. As such, the web content server 102 represents a web server and other content server for purposes of the present description. It should be noted that the web content server 102 may be any device capable of serving content to a web client device, such as the web client_1 106 through the web client_N 110. Additionally, the web content server 102 and any of the web client_1 106 through the web client_N 110 may be any computing device capable of processing information as described above and in more detail below. For example, the web content server 102 and the web client_1 106 through the web client_N 110 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 includes any form of interconnection suitable for the intended purpose, including a private or public network such as an intranet or the Internet, respectively, direct inter-module interconnection, dial-up, wireless, or any other interconnection mechanism capable of interconnecting the devices within the system 100.

Figure 2:
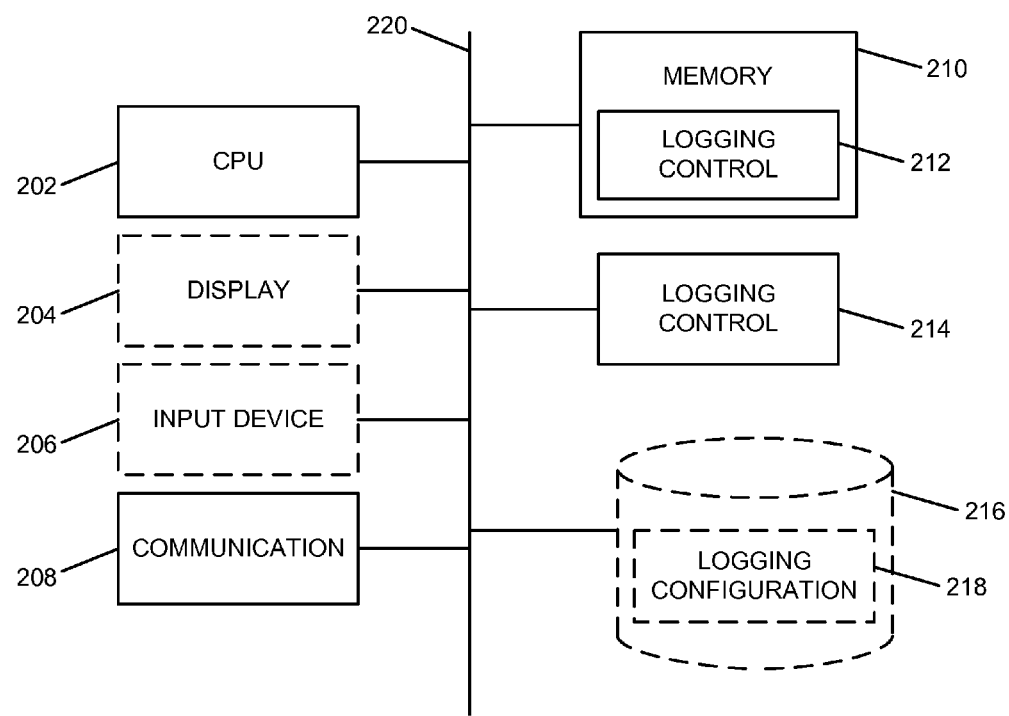
FIG. 2 is a block diagram of an example of an implementation of a core processing module that is capable of providing automated server controlled client-side logging for web devices, such as a web content server and a web client device according to an embodiment of the present subject matter.

FIG. 2 is a block diagram of an example of an implementation of a core processing module 200 that is capable of providing automated server controlled client-side logging for web devices, such as the web content server 102 and the web client_1 106 through the web client_N 110 of FIG. 1. It is understood that the core processing module 200 or a similar module may be implemented for the web content server 102 and for any of the web client_1 106 through the web client_N 110. For brevity, the core processing module 200 will be described generally. However, the description of the core processing module 200 shall be considered applicable to each of the web content server 102 and any of the web client_1 106 through the web client_N 110, as appropriate.

Differences may also exist for implementations of the core processing module 200 on the web content server 102 and any of the web client_1 106 through the web client_N 110. For example, the core processing module 200 provides the client-side logging executable syntax for execution by web client devices when implemented on a server device, such as the web content server 102. Similarly, the core processing module 200 may execute client-side logging executable syntax provided by the web content server 102 when implemented on a device, such as any of the web client_1 106 through the web client_N 110. Certain distinctions between operation of certain modules between server-side and client-side implementations of the core processing module 200 shall be described in detail below. However, it is understood that many additional distinctions are possible based upon the present description and all are considered within the scope of the present subject matter.

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components of the core processing module 200 for certain implementations. Accordingly, the core processing module 200 may operate as a completely automated embedded device without user configurability or feedback when implemented on devices such as the web content server 102. However, the core processing module 200 may also provide user feedback and configurability via the display 204 and the input device 206, respectively, when implemented on devices such as the web client_1 106 through the web client_N 110.

A communication module 208 provides interconnection capabilities that allow the core processing module 200 to communicate with other modules within the system 100. For example, the communication module 208 provides communication between modules, such as the web content server 102 and the web client_1 106 through the web client_N 110, to allow the web content server 102 to send web content and configured client-side logging executable syntax to a respective web client device and to receive log information and log records from the respective web client device. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a logging control storage area 212 that stores information associated with logging configuration and control for the core processing module 200. For example, when the core processing module 200 is implemented on the web content server 102, the logging control storage area 212 provides storage for outstanding web content requests and any configured client-side logging executable syntax sent in response to such a request. Similarly, when the core processing module 200 is implemented on a web client device, such as the web client_1 106 through the web client_N 110, the logging control storage area 212 provides storage for outstanding web content requests sent to the web content server 102 and any configured client-side logging executable syntax received in response to such a request. The logging control storage area 212 may also store configuration information for logging enablement status and logging level associated with a particular device and/or the requested web content.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

A logging control module 214 provides the automated server controlled client-side logging for devices within the system 100, as described above and in more detail below. For example, when the core processing module 200 is implemented on the web content server 102, the logging control module 214 configures the client-side logging executable syntax sent in response to requests for web content. Similarly, when the core processing module 200 is implemented on a web client device, such as the web client_1 106 through the web client_N 110, the logging control module 214 executes the configured client-side logging executable syntax received in response to such web content requests and generates log information and log records that are returned to the web content server 102. It should be noted that the logging control module 214 may further form a portion of a browser module or a browser application when implemented on one of the web client_1 106 through the web client_N 110 without departure from the scope of the present subject matter.

A database 216 is associated with the core processing module 200 and provides storage capabilities for information associated with the automated server controlled client-side logging. The database 216 includes a logging configuration storage area 218 that may be stored in the form of tables or other arrangements accessible by the core processing module 200. For example, when the core processing module 200 is implemented on the web content server 102, the logging configuration storage area 218 stores logging configuration information and content, such as executable taglib definitions, classes, packages, and other associated logging control information. The logging configuration storage area 218 may also store the logging enablement status and logging level associated with a particular device and/or the requested web content. Similarly, the logging configuration storage area 218 may be implemented on devices, such as the web client_1 106 through the web client_N 110 to store configured client-side logging executable syntax, logging enablement status, and logging level received from web content servers, such as the web content server 102.

It is noted that the database 216 and the logging configuration storage area 218 are illustrated as dashed-line components within the core processing module 200 to illustrate that they may be optional components on devices, such as the web client_1 106 through the web client_N 110. However, it is understood that the database 216 and the logging configuration storage area 218 may be provided within web client devices to provide any suitable storage capabilities associated with the automated server controlled client-side of the present subject matter.

The CPU 202, the display 204, the input device 206, the communication module 208, the memory 210, and the database 216 are interconnected via an interconnection 220. The interconnection 220 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the logging configuration storage area 218 is shown within the database 216, it may also be stored within the memory 210 without departure from the scope of the present subject matter.

Accordingly, the core processing module 200 may take many forms and may be associated with many platforms. FIG. 3 through FIG. 6 below describe example processes that may be executed by the core processing module 200 and/or executed by the CPU 202 or the logging control module 214 to perform the automated server controlled client-side logging associated with the present subject matter.

Prior to a description of FIG. 3 through FIG. 6, the following additional examples of pseudo code will be described to provide context for the description of the Figures that follow. As described above and in more detail below, the web content server 102 sends the client-side logging information (e.g., client-side logging executable syntax) to web client devices to inform logging and tracing functions executed by the web client devices of a requested level of tracing and/or logging. The logging and tracing functions may form a part of Javascript applications (e.g., a web browsers) executed by the respective web client devices.

The client-side logging information may be transferred from the web content server 102 to the respective web client device, for example, as Javascript variable values in a markup language format such as a portion of an HTML page containing a Javascript application. The variable values may be inserted into the HTML page by the web content server 102 at the time the page is assembled through the use of tags that are interpreted by a JavaServer Pages (JSP) compiler into Java code that runs each time the HTML page is rendered. The Java code inserts appropriate Javascript variable declarations depending on trace and log levels configured and/or provisioned in association with the web content server 102. As such, the trace and log level values may be derived from server-level trace configuration tags executed as part of the HTML page rendering. The trace and log level values may, for example, be provided by Java taglibs, as described in more detail below.

For purposes of the present example, a Java class that implements a taglib definition may be designated as:
com.sample.jslogging.EnableLoggingTag.java
A taglib that uses this Java function may be imported into a JSP and given a namespace such as:
<% @ taglib uri="/WEB-INF/tld/logging.tld" prefix="log" %>
An associated tag to enable logging by inserting Javascript variables in the JSP may be represented as follows:
<log:enableLogging> (e.g., <myprefix:myaction>).
To disable logging, the following tag may be used:
</log:enableLogging>
An example tag implementation class for the example "enableLogging" tag below generates a script that creates variables upon execution by the respective JSP of the "enableLogging" tag when the associated web content is rendered. For purposes of the present example, it should be noted that it is assumed that three different logging levels are available for configuration. These example logging levels are information (e.g., info), warning (e.g., warn), and error (e.g., error). However, it should also be noted that many other logging levels and options are available and all are considered within the scope of the present subject matter. The example tag implementation class is represented by the following pseudo code:

```
public class EnableLoggingTag implements Tag {
    LogService logService = LogService.INSTANCE;
    public int doStartTag( ) throws JspException {
        write("<SCRIPT>");
```

```
        if (logService.getLoglevel( ) == WARN) {
            write(" var infoLoggingEnabled=false;");
            write(" var warnLoggingEnabled=true;");
            write(" var errorLoggingEnabled=true;");
        } else if (logService.getLoglevel( ) == INFO) {
            write(" var infoLoggingEnabled=true;");
            write(" var warnLoggingEnabled=true;");
            write(" var errorLoggingEnabled=true;");
        } else if (logService.getLoglevel( ) == ERROR) {
            write(" var infoLoggingEnabled=false;");
            write(" var warnLoggingEnabled=false;");
            write(" var errorLoggingEnabled=true;");
        }
        write("<\SCRIPT>");
    }
}
```

As can be seen from the example pseudo code above, a conditional statement within the tag class generates a script based upon a configured logging service level provided by the "logService.getLoglevel( )" operation. Based upon this example pseudo code, if a web content server administrator desires to set a client-side logging level via the web content server 102 to enable warning log generation for execution of the web content via web client devices, the logging configuration may be set at the web content server 102 via the following configuration:

com.sample.jslogging.EnableLoggingTag=WARN

As a result of this warning level configuration and as shown above in the example tag implementation class pseudo code, execution of the "enableLogging" tag inserts the following Javascript variables where the "enableLogging" tag was originally located within the HTML page:

```
<SCRIPT>
var infoLoggingEnabled=false;
var warnLoggingEnabled=true;
var errorLoggingEnabled=true;
</SCRIPT>
```

As can be seen from this example, a logging level of warning enables both warning and error logging at the respective web client device. With these logging levels set, Javascript logging functions, as described below in association with FIG. 5, may monitor execution of the web content on the respective web client device and log records may be generated and forwarded for the matching levels (e.g., warning and error log records in this example) back to the web content server 102.

Considering the example configuration above (e.g., com.sample.jslogging.EnableLoggingTag=WARN), processing of tags based upon this example configuration would set logging to the warning level for all requests. However, as described above and in more detail below, the log enablement configuration may also include additional specifications, such as an IP address or user ID and/or username associated with a user of a particular web client device, such as any of the web client_1 106 through the web client_N 110. The taglib class may then be modified based upon the example above to use this additional information to configure appropriate client-side logging executable syntax, such as JavaScript variables, for web content delivered to a particular web client device. This additional functionality may be implemented by adding a user ID and/or user name to the tag as in the following example:

com.sample.jslogging.EnableLoggingTag=wpsadmin= WARN

As can be seen from this example, an administrator user name (i.e., wpsadmin) has been added to the logging configuration. In this example situation, the conditional statement within the tag class pseudo code above may be modified to evaluate whether the user name is associated with a given request for web content. Within this example, the taglib sets the Javascript logging level to warning if a web client device in use by the administrator "wpsadmin" makes a request for the associated web content to the web content server 102. For any other web content requests, logging would not be enabled within this example.

Similarly, additional functionality may be implemented by adding an IP address as in the following example:

com.sample.jslogging.EnableLoggingTag=9.65.23.190= WARN

As can be seen from this example, an IP address (i.e., 9.65.23.190) has been added to the logging configuration. In this example situation, the conditional statement within the tag class pseudo code above may be modified to evaluate whether the IP address is associated with a given request for web content. Within this example, the taglib sets the Javascript logging level to warning if a web client device with an IP address of "9.65.23.190" issues a request for the associated web content to the web content server 102. For any other web content requests, logging would not be enabled within this example.

As can be seen from the examples above, the present subject matt er provides a flexible approach to server configuration administration to enable automated server controlled client-side logging for web client devices, such as any of the web client_1 106 through the web client_N 110. Many other variations on the examples above are possible and all are considered within the scope of the present subject matter.

FIG. 3 through FIG. 6 below describe example processes that may be executed by web content server devices, such as the web content server 102 or by web client devices, such as the web client_1 106 through the web client_N 110, to perform the automated server controlled client-side logging associated with the present subject matter. Many other variations on the example processes are possible and all are considered within the scope of the present subject matter. The example processes may be performed by modules, such as the logging control module 214 and/or executed by the CPU 202, associated with web content server and/or web client devices. It should be noted that time out procedures and other error control procedures are not illustrated within the example processes described below for ease of illustration purposes. However, it is understood that all such procedures are considered to be within the scope of the present subject matter.

Figure 3:
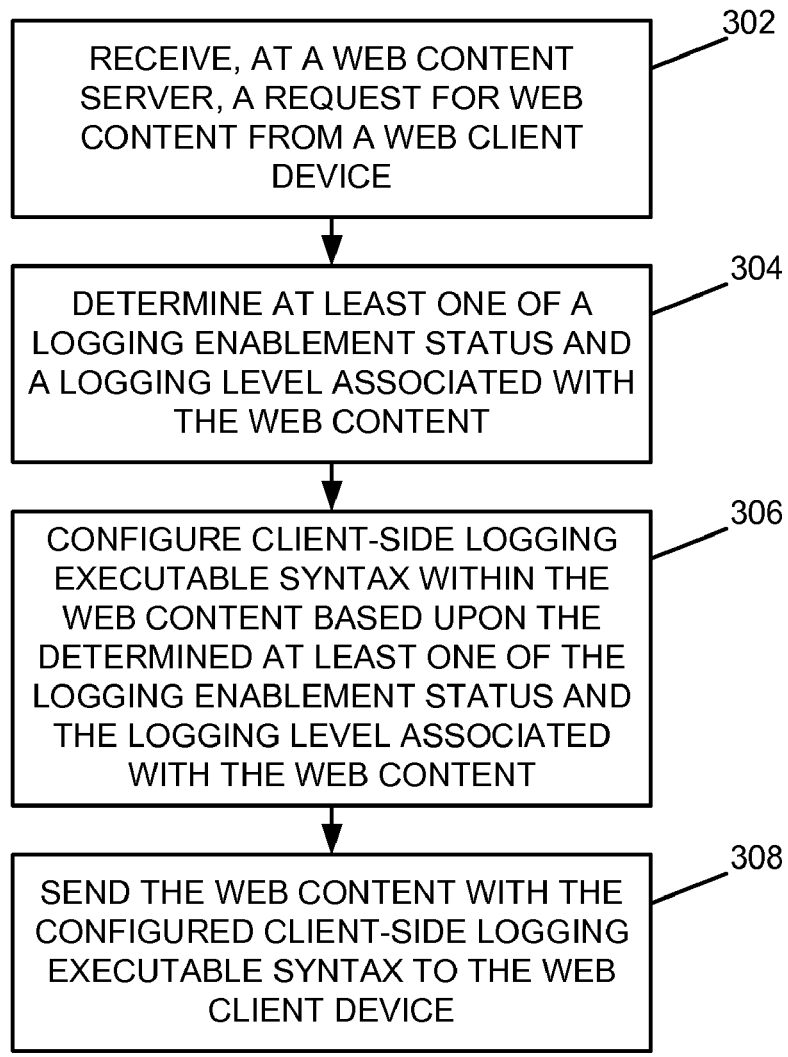
FIG. 3 is a flow chart of an example of an implementation of a process executable by a web content server to provide automated server controlled client-side logging capabilities for web client devices according to an embodiment of the present subject matter.

FIG. 3 is a flow chart of an example of an implementation of a process 300 executable by a web content server to provide automated server controlled client-side logging capabilities for web client devices. At block 302, the process 300 receives, at a web content server, a request for web content from a web client device. At block 304, the process 300 determines at least one of a logging enablement status and a logging level associated with the web content. At block 306, the process 300 configures client-side logging executable syntax within the web content based upon the determined at least one of the logging enablement status and the logging level associated with the web content. At block 308, the process 300 sends the web content with the configured client-side logging executable syntax to the web client device.

Figure 4:
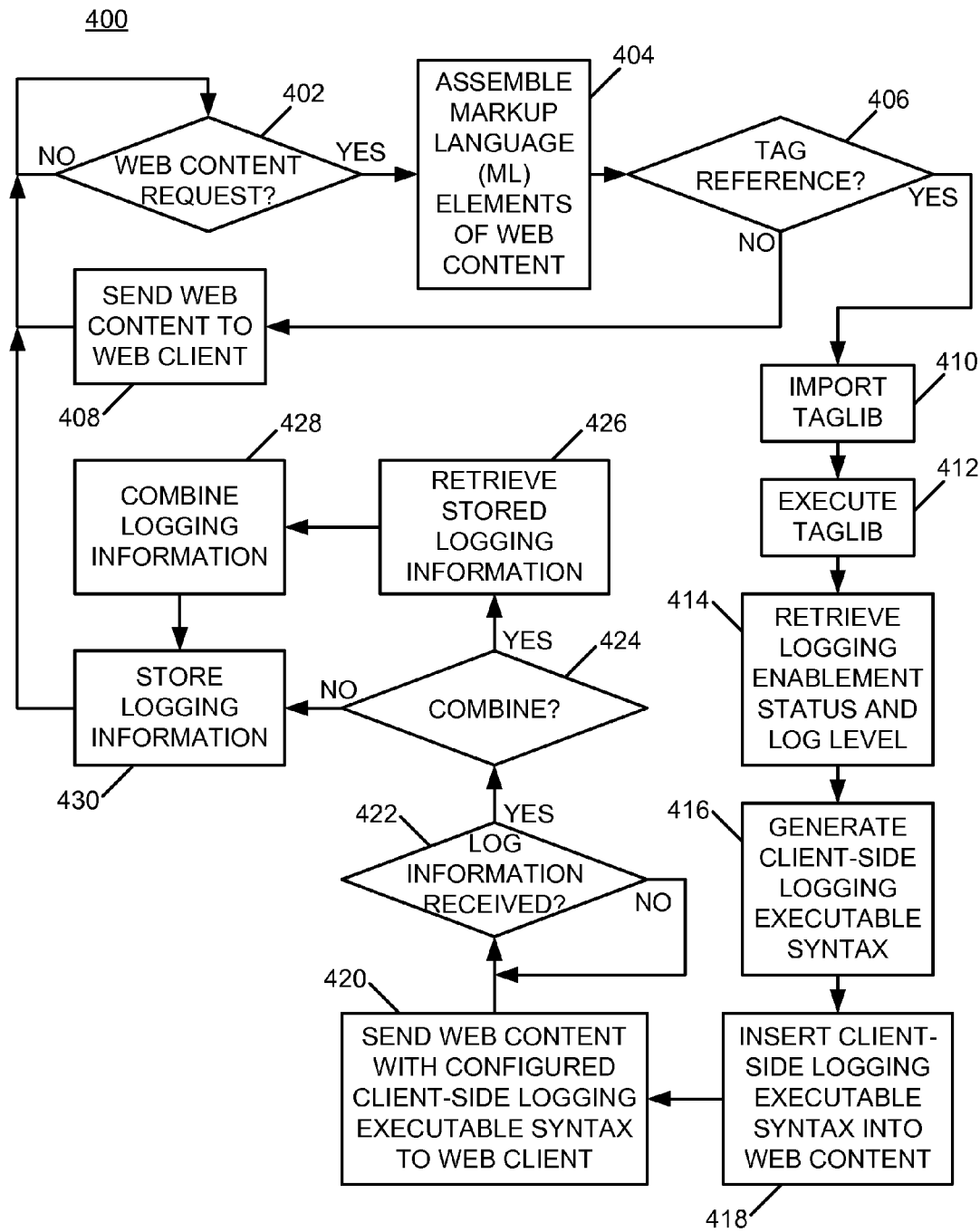
FIG. 4 is a flow chart of an example of an implementation of a process for performing automated server controlled client-side logging at a web content server device according to an embodiment of the present subject matter.

FIG. 4 is a flow chart of an example of an implementation of a process 400 for performing automated server controlled client-side logging at a web content server device, such as the web content server 102. The process 400 waits at decision point 402 for a web content request to be received. As described above, a web content request may be generated by a web client device, such as any of the web client_1 106 through the web client_N 110. The web content request may be generated by the respective web client device in response to a user entering a uniform resource locator (URL) within a browser application executed by the web client device or by the user selecting a hypertext link associated with rendered web content within the browser application. Additionally, as described above, the request may include an IP address and/or a user ID/user name associated with the respective web client device.

Upon receipt of a web content request, the process 400 assembles markup language (ML) elements of the requested web content at block 404. As described above, the ML elements may be formatted in HTML or another markup language. At decision point 406, the process 400 makes a determination as to whether a tag reference is present within the markup language content. As described above, the tag reference may include a Java tag reference within the web content. The Java tag reference may identify a component within a Java taglib configured based upon a logging enablement status and/or a logging level associated with the web content. As such, the process 400 may determine a logging enablement status and/or a logging level associated with the web content by identifying the tag reference within the web content. Further, identification of the logging enablement status and the logging level may be based upon any received IP address and/or user ID/user name associated with the web client device that initiated the web content request.

When a determination is made at decision point 406 that a tag reference is not present within the web content, the process 400 sends the web content to the requesting web client device at block 408. The process 400 returns to decision point 402 to await a new web content request.

When a determination is made at decision point 406 that a tag reference is present within the web content, the process 400 imports the taglib reference by the tag at block 410. At block 412, the process 400 executes the taglib. As described above, execution of the taglib may include execution of functionality within a compiled class instance associated with the taglib. Additionally, execution of the taglib provides client-side logging executable syntax for insertion into the web content. In association with execution of the taglib, the process 400 retrieves a logging enablement status and a logging level associated with the web content at block 414.

As also described above, the logging enablement status and logging level may be configured in association with a logging configuration set at the web content server 102. The logging enablement status and logging level configured at the web content server 102 may also be associated with an IP address and/or user ID/user name associated with the requesting web client device. Additionally, the logging enablement status and logging level may be configured either statically or dynamically by a web content server administrator via a user interface associated with the web content server 102. As further described in more detail below in association with FIG. 6, the logging enablement status and logging level may also be dynamically established based upon requests from authorized users of web client devices, such as any of the web client_1 106 through the web client_N 110.

At block 416, the process 400 generates client-side logging executable syntax. Generation of the client-side logging executable syntax may be performed as part of execution of the taglib. The generated client-side logging executable syntax may include Javascript variables or other executable code that instructs the web client device to generate client-side logging information upon execution of the executable syntax. It should also be noted that the process 400 may generate client-side logging executable syntax that further instructs the web client device to generate client-specific logging information. This client-specific logging information may be distinct from server-specific logging information generated by the web content server 102. As such, logging information received from a specific web client device, such as the web client_1 106, may be distinguished from server-side logging information. Additionally, logging information received from the web client_1 106 may also be distinguished from logging information received from other web client devices. At block 418, the process 400 inserts the client-side logging executable syntax into the web content. At block 420, the process 400 sends the web content with the configured client-side logging executable syntax to the web client device.

At decision point 422, the process 400 waits for log information to be received from the requesting web client device. The log information may be received in response to execution of the generated client-side logging executable syntax at the requesting web client device. It should be noted that the example process 400 receives log information as a single log record entry or as a batch of log record entries from the requesting web client device for ease of illustration purposes. However, it is understood that additional processing to receive log records asynchronously and repeatedly may be performed without departure from the scope of the present subject matter.

Upon receipt of the logging information from the requesting web client device, the process 400 makes a determination at decision point 424 as to whether to combine the received logging information with other logging information stored at the web content server 102. As described above, the received logging information may be combined with server-side logging information and may be combined with logging information received from other web client devices.

When a determination is made at decision point 424 to combine the received logging information with other logging information stored at the web content server 102, the process 400 retrieves stored logging information with which the received logging information is to be combined at block 426. At block 428, the process 400 combines the received logging information with the retrieved stored logging information.

Upon completion of the combination of the received logging information with the retrieved logging information, or upon determining not to combine the received logging information with other logging information stored at the web content server 102 at decision point 424, the process 400 stores either the combined logging information or the received logging information, respectively, at block 430. The process 400 returns to decision point 402 to await another web content request.

It is understood that additional processing may be performed on any received and/or combined logging information. This additional processing is not illustrated within FIG. 4 for ease of illustration purposes. However, it is understood that many forms of additional processing, such as debugging and/or diagnostic processing, may be performed on the received logging information. As such, any such processing is considered within the scope of the present subject matter.

Figure 5:
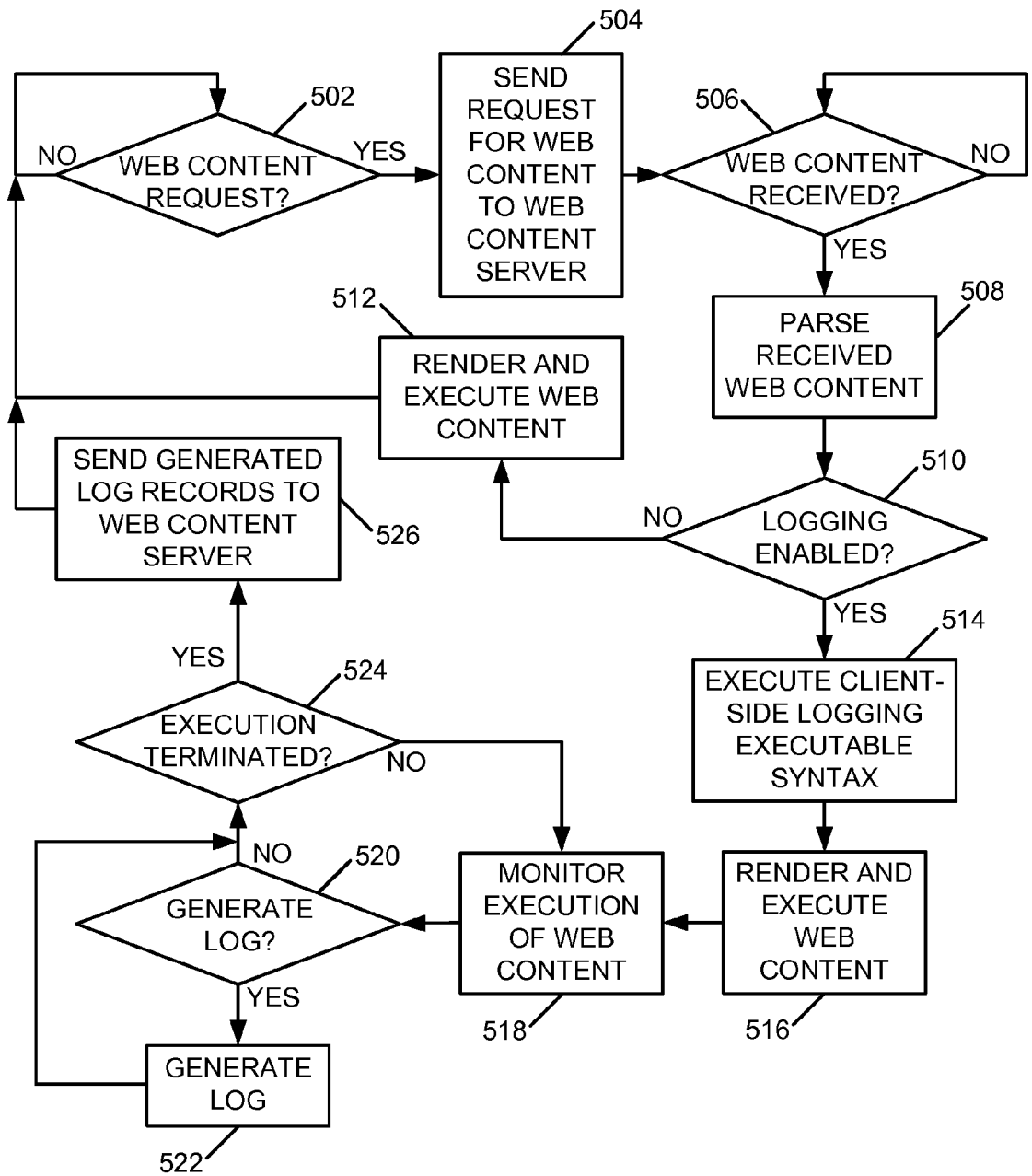
FIG. 5 is a flow chart of an example of an implementation of a process for performing client-side processing associated with automated server controlled client-side logging at a web client device according to an embodiment of the present subject matter.

FIG. 5 is a flow chart of an example of an implementation of a process 500 for performing client-side processing associated with automated server controlled client-side logging at a web client device, such as any of the web client_1 106 through the web client_N 110. At decision point 502, the process 500 waits for a web content request. The web content request may be initiated by a user of a web client device, such as any of the web client_1 106 through the web client_N 110, by entry of a uniform resource locator (URL) within a web browser application executed by the respective web client device or by selection of a hypertext link associated with the rendered web content via a user interface of the respective web client device. The user interface may include the display 204 and the input device 206 as described above.

When a determination is made that a web content request has been received, the process 500 sends the request for web content to a web content server device, such as the web content server 102, associated with the requested web content at block 504. At decision point 506, the process 500 waits for the requested web content to be received. Upon receipt of the requested web content, the process 500 parses the received web content at block 508.

At decision point 510, the process 500 makes a determination as to whether logging is enabled within the received web content. As described above, logging may be enabled and configured for a given web client device by inclusion of client-side logging executable syntax within the received web content. This client-side logging executable syntax may be configured by the web content server 102 based upon the logging enablement status and/or a logging level associated with the web content and/or the web content server 102.

When a determination is made that no client-side logging executable syntax is associated with the received web content, the process 500 renders and executes any executable syntax associated with the received web content at block 512 and returns to decision point 502 to await a new web content request. When a determination is made that logging is enabled within the received web content, the process 500 executes the received client-side logging executable syntax at block 514. As described above, execution of the client-side logging executable syntax may include instantiation of variables, such as Javascript variables, and may include execution of additional Javascript code. Many other possibilities exist for enablement and configuration of client-side logging executable syntax and all are considered within the scope of the present subject matter. At block 516, the process 500 renders and executes any executable syntax associated with the received web content other than the client-side logging executable syntax.

At block 518, the process 500 monitors execution of the web content based upon the logging configuration as represented by the executed client-side logging executable syntax. At decision point 520, the process 500 makes a determination as to whether to generate a log record based upon the monitored execution of the web content. As described above, log records may be generated to indicate information, warning, error, or any other suitable logging level associated with execution of web content. When a determination is made to generate a log record based upon the monitored execution of the web content, the process 500 generates a log record at block 522. Log records are generated based upon detected events associated with execution of the web content that match the enabled logging level associated with the web content. Upon generation of the log record, or upon determining that no log record is to be generated at decision 520, the process 500 makes a determination at decision 524 as to whether execution of the web content has been terminated. The determination as to whether execution of the web content has been terminated may be based upon, for example, closing of a web browser application at the respective web client device. Additionally, this determination may be made based upon a request issued by the respective web client device to disable logging as described in more detail below in association with FIG. 6.

When a determination is made at decision point 524 that execution has not been terminated, the process 500 returns to block 518 to monitor execution of the web content. The process 500 iterates between monitoring execution of the web content at block 518, making a determination for generation of log records at decision point 520, and making a determination as to whether execution has terminated at decision point 524. The process 500 iterates as described above until a determination is made a decision point 524 that execution of the web content has been terminated. Upon termination of execution of the web content, the process 500 sends any generated log records to the web content server 102 at block 526. It should be noted that the example process 500 sends log information as a single log record entry or as a batch of log record entries to the web content server 102 for ease of illustration purposes. However, it is understood that additional processing to send log records asynchronously and repeatedly may be performed without departure from the scope of the present subject matter. The process 500 returns to decision point 502 to await a new web content request.

Figure 6:
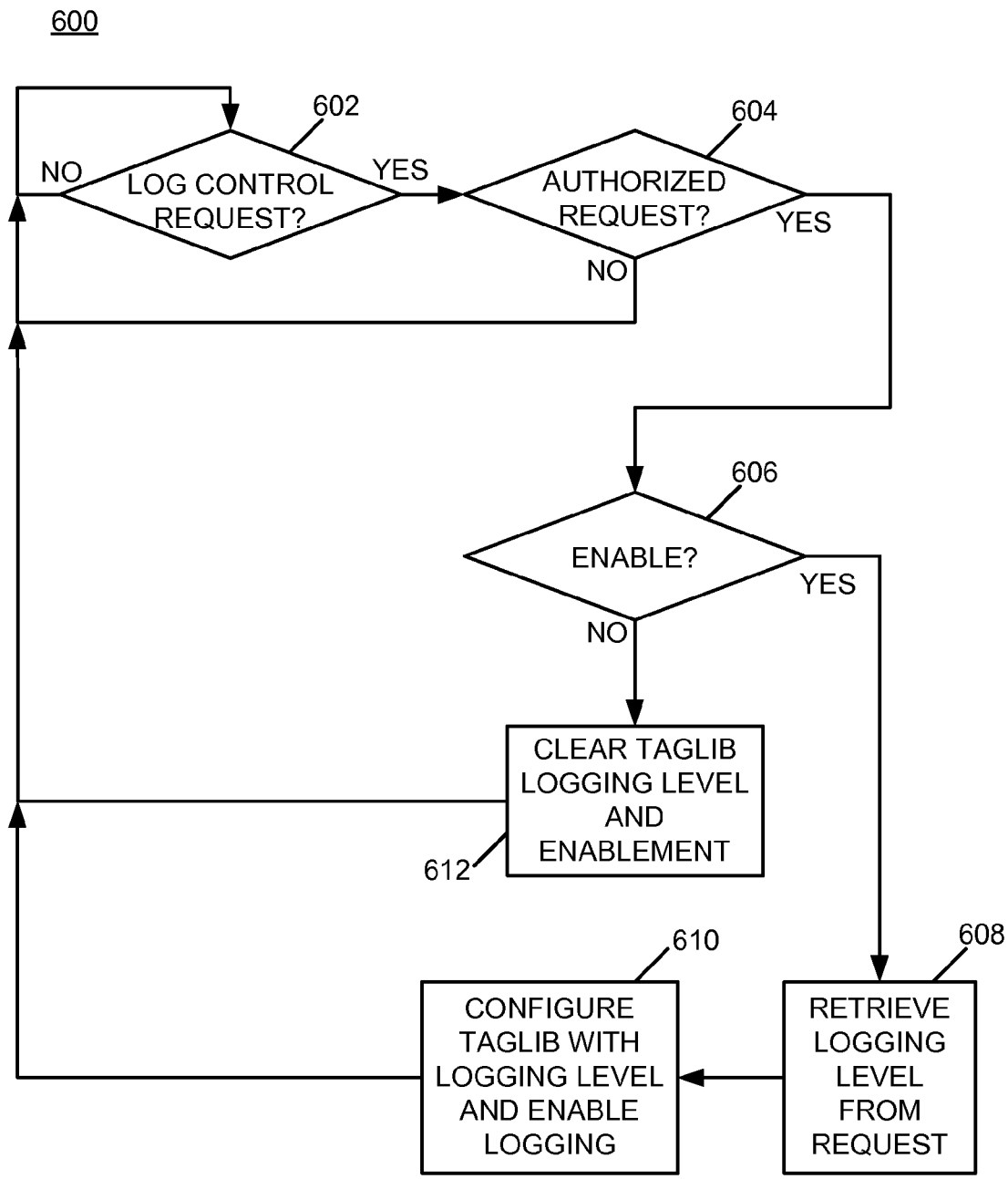
FIG. 6 is a flow chart of an example of an implementation of a process that may be executed by a web content server device to process logging enablement-related requests received from web client devices according to an embodiment of the present subject matter.

FIG. 6 is a flow chart of an example of an implementation of a process 600 that may be executed by a web content server device, such as the web content server 102, to process logging enablement-related requests received from web client devices, such as any of the web client_1 106 through the web client_N 110. At decision point 602, the process 600 waits to receive a log control request from a given web client device. This indication may be initiated, for example, from an authorized user of a web client device via a user interface of the respective web client device. The user interface may include the display 204 and the input device 206 of the respective web client device. The authorized user may, for example, be a developer associated with the web content and may be operating the respective web client device for debugging and/or diagnostic purposes.

Upon receipt of a logging control request at decision point 602, the process 600 determines whether the request is associated with an authorized user and/or web client device at decision point 604. As described above, logging may be enabled for specific web client devices, such as via an IP address and/or a user ID/user name associated with the respective web client device. Additional processing to differentiate between processing for verification of an IP address and a user ID/user is not illustrated within FIG. 6 for ease of illustration purposes. However, it is understood that such additional processing is considered within the scope of the present subject matter. When a determination is made that the request is not an authorized request, such as a failure of an IP address and/or user ID/user name to match any authorized IP address or user ID/user name, the process 600 returns to decision point 602 to await another request.

When a determination is made that the request is an authorized request, the process 600 makes a determination at decision point 606 as to whether the logging control request is a request to enable or disable logging activities for the web content server 102. When a determination is made that the logging control request is to enable logging for the web content server 102, the process 600 retrieves a logging level from the request at block 608. As described above, the retrieved logging level associated with the logging control request may include information, warning, error, or any other suitable logging request level. At block 610, the process 600 configures a taglib with the retrieved logging level and enables logging. The process 600 then returns to decision point 602 to await another logging control request.

Returning to the description of decision point 606, when a determination is made that the logging control request is a request to disable logging for the web content server 102, the process 600 clears a taglib logging level and enablement at block 612 and returns to decision point 602 to await a new logging control request. As such, the process 600 provides an example approach to allow developers situated at web client devices, such as any of the web client_1 106 through the web client_N 110, to enable and disable logging for the web content server 102.

It should be noted, as described above, that an authorized user of a web client device may also be authorized to initiate a request to the web client device to display log information on the web client device, such as via the display 204, to allow the developer to debug and/or diagnose execution behavior associated with web content downloaded from the web content server 102. This additional processing for web client devices, such as the web client_1 106 through the web client_N 110, is not illustrated within the Figures described above for ease of illustration purposes. However, it is understood that such processing is also considered within the scope of the present subject matter.

As described above in association with FIGS. 1 through 6, the example systems and processes provide automated server controlled client-side logging for web client devices. Many other variations and additional activities associated with automated server controlled client-side logging are possible and all are considered within the scope of the present subject matter.

Those skilled in the art will recognize, upon consideration of the above teachings, that certain of the above examples are based upon use of a programmed processor such as the CPU 202. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable storage medium(s) may be utilized. The computer-usable or computer readable storage medium may be, for example but not limited to, an electronic, magnetic, optical, electromagnetic, infrared, or semiconductor system, apparatus, or device medium. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer readable storage medium may be any medium that can contain, store, communicate, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer or other programmable data processing apparatus to function in a particular manner, such that the instructions stored in the computer readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
    receiving, at a web content server, a request for web content from a web client device, where the web content comprises executable syntax;
    determining at least one of a logging enablement status and a logging level associated with the web content, comprising:
        assembling markup language (ML) elements of the web content; and
        identifying a Java tag reference within the web content, where the Java tag reference identifies a component within a Java taglib configured based upon the at least one of the logging enablement status and the logging level associated with the web content;
    configuring client-side web content execution logging executable syntax within the web content based upon the determined at least one of the logging enablement status and the logging level associated with the web content, comprising:
        importing the Java taglib into a JavaServer Pages (JSP) component; and
        executing the Java taglib;
    where the client-side web content execution logging executable syntax provides debugging and diagnostic capabilities for the executable syntax of the web content during execution of the executable syntax of the web content by the web client device; and
    sending the web content with the configured client-side web content execution logging executable syntax to the web client device.

2. The method of claim 1, where the request for the web content received from the web client device comprises at least one of an Internet protocol (IP) address associated with the web client device and a user identifier (ID) associated with the web client device and where:
    determining the at least one of the logging enablement status and the logging level associated with the web content comprises determining the at least one of the logging enablement status and the logging level associated with the web content based upon the at least one of the Internet protocol (IP) address associated with the web client device and the user ID associated with the web client device; and
    configuring the client-side web content execution logging executable syntax within the web content based upon the determined at least one of the logging enablement status and the logging level associated with the web content comprises configuring the client-side web content execution logging executable syntax within the web content based upon the at least one of the Internet protocol (IP) address associated with the web client device and the user identifier (ID) associated with the web client device.

3. The method of claim 1, further comprising:
    receiving client-side logging information from the web client device in response to execution of the configured client-side web content execution logging executable syntax by the web client device; and
    storing the received client-side logging information within a memory associated with the web content server.

4. The method of claim 3, where the client-side web content execution logging executable syntax comprises at least one Javascript variable associated with the at least one of the logging enablement status and the logging level associated with the web content and where configuring the client-side web content execution logging executable syntax within the web content comprises inserting the at least one Javascript variable associated with the at least one of the logging enablement status and the logging level into the web content.

5. The method of claim 1, where configuring the client-side web content execution logging executable syntax within the web content based upon the determined at least one of the logging enablement status and the logging level associated with the web content comprises:
    configuring client-specific web content execution logging executable syntax within the web content that instructs the web client device to generate client-specific logging information distinct from server-specific logging information generated by the web content server.

6. The method of claim 1, further comprising:
    receiving client-side logging information from the web client device in response to execution of the configured client-side web content execution logging executable syntax by the web client device; and
    combining the client-side logging information received from the web client device with server-side logging information generated by the web content server.

7. The method of claim 1, further comprising receiving a request to enable client-side logging from the web client device and where configuring the client-side web content execution logging executable syntax within the web content is performed in response to receipt of the request to enable client-side logging received from the web client device.

8. A system, comprising:
    a memory adapted to store logging information; and
    a processor programmed to:
        receive, at a web content server, a request for web content from a web client device, where the web content comprises executable syntax;

determine at least one of a logging enablement status and a logging level associated with the web content based upon the logging information stored within the memory, where the processor is programmed to:
    assemble markup language (ML) elements of the web content; and
    identify a Java tag reference within the web content, where the Java tag reference identifies a component within a Java taglib configured based upon the at least one of the logging enablement status and the logging level associated with the web content;
configure client-side web content execution logging executable syntax within the web content based upon the determined at least one of the logging enablement status and the logging level associated with the web content, where the processor is programmed to:
    import the Java taglib into a JavaServer Pages (JSP) component; and
    execute the Java taglib;
where the client-side web content execution logging executable syntax provides debugging and diagnostic capabilities for the executable syntax of the web content during execution of the executable syntax of the web content by the web client device; and
send the web content with the configured client-side web content execution logging executable syntax to the web client device.

9. The system of claim 8, where the request for the web content received from the web client device comprises at least one of an Internet protocol (IP) address associated with the web client device and a user identifier (ID) associated with the web client device and where:
in being programmed to determine the at least one of the logging enablement status and the logging level associated with the web content, the processor is programmed to determine the at least one of the logging enablement status and the logging level associated with the web content based upon the at least one of the Internet protocol (IP) address associated with the web client device and the user ID associated with the web client device; and
in being programmed to configure the client-side web content execution logging executable syntax within the web content based upon the determined at least one of the logging enablement status and the logging level associated with the web content, the processor is programmed to configure the client-side web content execution logging executable syntax within the web content based upon the at least one of the Internet protocol (IP) address associated with the web client device and the user identifier (ID) associated with the web client device.

10. The system of claim 8, where the processor is further programmed to:
receive client-side logging information from the web client device in response to execution of the configured client-side web content execution logging executable syntax by the web client device; and
store the received client-side logging information within the memory.

11. The system of claim 10, where the client-side web content execution logging executable syntax comprises at least one Javascript variable associated with the at least one of the logging enablement status and the logging level associated with the web content and where, in being programmed to configure the client-side web content execution logging executable syntax within the web content, the processor is programmed to insert the at least one Javascript variable associated with the at least one of the logging enablement status and the logging level into the web content.

12. The system of claim 8, where, in being programmed to configure the client-side web content execution logging executable syntax within the web content based upon the determined at least one of the logging enablement status and the logging level associated with the web content, the processor is programmed to:
configure client-specific web content execution logging executable syntax within the web content that instructs the web client device to generate client-specific logging information distinct from server-specific logging information generated by the web content server.

13. The system of claim 8, where the processor is further programmed to:
receive client-side logging information from the web client device in response to execution of the configured client-side web content execution logging executable syntax by the web client device; and
combine the client-side logging information received from the web client device with server-side logging information generated by the web content server.

14. The system of claim 8, where the processor is further programmed to:
receive a request to enable client-side logging from the web client device; and
configure the client-side web content execution logging executable syntax within the web content in response to receipt of the request to enable client-side logging received from the web client device.

15. A system, comprising:
a memory adapted to store logging configuration information; and
a processor programmed to:
    receive, at a web content server, a request for web content from a web client device;
    determine at least one of a logging enablement status and a logging level associated with the web content based upon the logging information stored within the memory;
    assemble markup language (ML) elements of the web content;
    identify a Java tag reference within the web content, where the Java tag reference identifies a component within a Java taglib configured based upon the at least one of the logging enablement status and the logging level associated with the web content;
    import the Java taglib into a JavaServer Pages (JSP) component;
    execute the Java taglib;
    generate, via the Java taglib component, client-side logging executable syntax comprising at least one Javascript variable associated with the at least one of the logging enablement status and the logging level associated with the web content;
    insert the client-side logging executable syntax into the web content;
    send the web content with the configured client-side logging executable syntax to the web client device;
    receive client-side logging information from the web client device in response to execution of the configured client-side logging executable syntax by the web client device; and
    store the received client-side logging information to the memory.

16. A computer program product comprising a computer useable storage device including a computer readable program, wherein the computer readable program when executed on a computer causes the computer to:
receive, at a web content server, a request for web content from a web client device, where the web content comprises executable syntax;
determine at least one of a logging enablement status and a logging level associated with the web content, comprising causing the computer to:
assemble markup language (ML) elements of the web content; and
identify a Java tag reference within the web content, where the Java tag reference identifies a component within a Java taglib configured based upon the at least one of the logging enablement status and the logging level associated with the web content;
configure client-side web content execution logging executable syntax within the web content based upon the determined at least one of the logging enablement status and the logging level associated with the web content, comprising causing the computer to:
import the Java taglib into a JavaServer Pages (JSP) component; and
execute the Java taglib;
where the client-side web content execution logging executable syntax provides debugging and diagnostic capabilities for the executable syntax of the web content during execution of the executable syntax of the web content by the web client device; and
send the web content with the configured client-side web content execution logging executable syntax to the web client device.

17. The computer program product of claim 16, where the request for the web content received from the web client device comprises at least one of an Internet protocol (IP) address associated with the web client device and a user identifier (ID) associated with the web client device and where:
in causing the computer to determine the at least one of the logging enablement status and the logging level associated with the web content, the computer readable program when executed on the computer causes the computer to determine the at least one of the logging enablement status and the logging level associated with the web content based upon the at least one of the Internet protocol (IP) address associated with the web client device and the user ID associated with the web client device; and
in causing the computer to configure the client-side web content execution logging executable syntax within the web content based upon the determined at least one of the logging enablement status and the logging level associated with the web content, the computer readable program when executed on the computer causes the computer to configure the client-side web content execution logging executable syntax within the web content based upon the at least one of the Internet protocol (IP) address associated with the web client device and the user identifier (ID) associated with the web client device.

18. The computer program product of claim 16, where the computer readable program when executed on the computer further causes the computer to:
receive client-side logging information from the web client device in response to execution of the configured client-side web content execution logging executable syntax by the web client device; and
store the received client-side logging information within a memory associated with the web content server.

19. The computer program product of claim 18, where the client-side web content execution logging executable syntax comprises at least one Javascript variable associated with the at least one of the logging enablement status and the logging level associated with the web content and where, in causing the computer to configure the client-side web content execution logging executable syntax within the web content, the computer readable program when executed on the computer causes the computer to insert the at least one Javascript variable associated with the at least one of the logging enablement status and the logging level into the web content.

20. The computer program product of claim 16, where, in causing the computer to configure the client-side web content execution logging executable syntax within the web content based upon the determined at least one of the logging enablement status and the logging level associated with the web content, the computer readable program when executed on the computer causes the computer to:
configure client-specific web content execution logging executable syntax within the web content that instructs the web client device to generate client-specific logging information distinct from server-specific logging information generated by the web content server.

21. The computer program product of claim 16, where the computer readable program when executed on the computer further causes the computer to:
receive client-side logging information from the web client device in response to execution of the configured client-side web content execution logging executable syntax by the web client device; and
combine the client-side logging information received from the web client device with server-side logging information generated by the web content server.

22. The computer program product of claim 16, where the computer readable program when executed on the computer further causes the computer to:
receive a request to enable client-side logging from the web client device; and
configure the client-side web content execution logging executable syntax within the web content in response to receipt of the request to enable client-side logging received from the web client device.

* * * * *